US011401409B2

(12) United States Patent
An et al.

(10) Patent No.: US 11,401,409 B2
(45) Date of Patent: Aug. 2, 2022

(54) THERMOPLASTIC RESIN COMPOSITION

(71) Applicant: LG CHEM, LTD., Seoul (KR)

(72) Inventors: Yong Hee An, Daejeon (KR); Yong Yeon Hwang, Daejeon (KR); Chun Ho Park, Daejeon (KR); Jang Won Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 113 days.

(21) Appl. No.: 16/618,772

(22) PCT Filed: Oct. 30, 2018

(86) PCT No.: PCT/KR2018/013032
§ 371 (c)(1),
(2) Date: Dec. 2, 2019

(87) PCT Pub. No.: WO2019/093703
PCT Pub. Date: May 16, 2019

(65) Prior Publication Data
US 2020/0165439 A1 May 28, 2020

(30) Foreign Application Priority Data

Nov. 9, 2017 (KR) .......................... 10-2017-0148529

(51) Int. Cl.
*C08L 51/00* (2006.01)
(52) U.S. Cl.
CPC ....... *C08L 51/003* (2013.01); *C08L 2205/025* (2013.01); *C08L 2205/035* (2013.01); *C08L 2205/06* (2013.01); *C08L 2205/20* (2013.01)
(58) Field of Classification Search
CPC .. C08L 51/003; C08L 51/06; C08L 2205/025; C08L 2205/035; C08L 2205/03; C08L 2205/06; C08L 2205/08; C08L 2205/18; C08L 2207/53; C08L 2666/28; C08L 2666/34; C08L 2666/68; C08L 25/12; C08L 25/14; C08L 67/02; C08K 5/0016; C08K 5/10; C08K 5/12
See application file for complete search history.

(56) References Cited

U.S. PATENT DOCUMENTS

| | | | | |
|---|---|---|---|---|
| 3,893,966 | A * | 7/1975 | Stein ...................... | C08F 279/04 524/307 |
| 4,184,993 | A | 1/1980 | Singh et al. | |
| 4,399,248 | A | 8/1983 | Singh et al. | |
| 5,180,786 | A * | 1/1993 | Era ...................... | C08F 279/02 525/204 |
| 6,433,081 | B1 | 8/2002 | Tokunaga et al. | |
| 11,198,775 | B2 * | 12/2021 | Tanaka .................... | C08L 33/06 |
| 2006/0111519 | A1 | 5/2006 | Strand et al. | |
| 2009/0110943 | A1 | 4/2009 | Nishimoto et al. | |
| 2010/0016507 | A1 | 1/2010 | Sumimoto et al. | |
| 2010/0160505 | A1 * | 6/2010 | Kumazawa ............. | C08L 35/06 524/112 |
| 2011/0269907 | A1 * | 11/2011 | Kumazawa ........... | C08L 51/006 525/64 |
| 2014/0142212 | A1 | 5/2014 | Chu et al. | |
| 2014/0336319 | A1 | 11/2014 | Kim et al. | |
| 2015/0225538 | A1 | 8/2015 | Kim et al. | |
| 2016/0200906 | A1 | 7/2016 | Niessner et al. | |
| 2017/0166724 | A1 | 6/2017 | Kim et al. | |
| 2018/0002522 | A1 | 1/2018 | Kim et al. | |

FOREIGN PATENT DOCUMENTS

| | | |
|---|---|---|
| CN | 101238177 A | 8/2008 |
| CN | 101448894 A | 6/2009 |
| CN | 103975010 A | 8/2014 |
| CN | 104603193 A | 5/2015 |
| CN | 105939991 A | 9/2016 |
| CN | 107207824 A | 9/2017 |
| JP | 2004-091795 A | 3/2004 |
| JP | 2007-332356 A | 12/2007 |
| JP | 2015-504950 A | 2/2015 |
| JP | 2015-520185 A | 7/2015 |
| JP | 2017-506216 A | 3/2017 |
| KR | 20080020994 A | 3/2008 |
| KR | 20090026746 A | 3/2009 |
| KR | 20120040771 A | 4/2012 |
| KR | 101192459 B1 | 10/2012 |
| KR | 20150002476 A | 1/2015 |
| KR | 20160048893 A | 5/2016 |
| KR | 20160057601 A | 5/2016 |
| KR | 20160072961 A | 6/2016 |

(Continued)

OTHER PUBLICATIONS

Search Report dated Jan. 29, 2019 for PCT Application No. PCT/KR2018/013032.
Japanese Office Action for JP 2019-561948; dated Oct. 27, 2020; 4 pages.
Chinese Office Action dated Sep. 10, 2021 CN 2018800348571; 5 pages.
Taiwanese Office Action dated Oct. 28, 2021 for TW 11021055350; 8 pages.

\* cited by examiner

*Primary Examiner* — Jane L Stanley

(74) *Attorney, Agent, or Firm* — Morgan, Lewis & Bockius LLP

(57) ABSTRACT

The present invention relates to a thermoplastic resin composition, including a first graft copolymer including an alkyl (meth)acrylate-based polymer-derived unit, an aromatic vinyl-based monomer-derived unit, and a vinyl cyanide-based monomer-derived unit; a copolymer including an aromatic vinyl-based monomer-derived unit and a vinyl cyanide-based monomer-derived unit; a polyester-based elastomer; and a phthalate-based plasticizer.

12 Claims, No Drawings

(56) References Cited

FOREIGN PATENT DOCUMENTS

| | | |
|---|---|---|
| KR | 20170068726 A | 6/2017 |
| TW | I396712 B | 5/2013 |
| WO | 2017-099410 A | 6/2017 |

THERMOPLASTIC RESIN COMPOSITION

CROSS-REFERENCE TO RELATED APPLICATION

The present application is a National Phase of International Application No. PCT/KR2018/013032 filed on Oct. 30, 2018 which claims the priority benefit of Korean Patent Application No. 10-2017-0148529, filed on Nov. 9, 2017 in the Korean Intellectual Property Office, the disclosure of which is incorporated herein by reference.

TECHNICAL FIELD

The present invention relates to a thermoplastic resin composition, and more particularly, to a thermoplastic resin composition exhibiting reduced whitening.

BACKGROUND ART

An acrylonitrile-styrene-acrylate copolymer including an alkyl (meth)acrylate-based polymer-derived unit, which is a representative example of a thermoplastic resin, exhibits excellent weather resistance and aging resistance. Thermoplastic resins are used in various fields such as automobiles, ships, leisure goods, building materials, and gardening, and the use thereof is rapidly increasing.

Meanwhile, as the level of emotional quality requirements of users is increasing, research into finishing substrates, such as ABS, PVC, and a steel plate, with a thermoplastic resin, to realize a luxurious appearance, excellent colorability, and weather resistance is underway. However, when finished at room temperature, a product surface is whitened, the original color thereof is lost, and the appearance thereof is deteriorated, due to the characteristics of a thermoplastic resin. Such a whitening event is caused by pores due to cracks present inside a thermoplastic resin. To reduce such a whitening phenomenon, a method of softening a thermoplastic resin by adjusting a rubber content in the thermoplastic resin or mixing the thermoplastic resin with an elastomer has been proposed.

However, development of a thermoplastic resin composition exhibiting reduced whitening and excellent mechanical characteristics, colorability, and surface gloss is insufficient.

DISCLOSURE

Technical Problem

Therefore, the present invention has been made in view of the above problems, and it is one object of the present invention to provide a thermoplastic resin composition exhibiting reduced whitening and excellent colorability, surface gloss, mechanical characteristics, and processability.

Technical Solution

In accordance with an aspect of the present invention, the above and other objects can be accomplished by the provision of a thermoplastic resin composition, including a first graft copolymer including an alkyl (meth)acrylate-based polymer-derived unit, an aromatic vinyl-based monomer-derived unit, and a vinyl cyanide-based monomer-derived unit; a copolymer including an aromatic vinyl-based monomer-derived unit and a vinyl cyanide-based monomer-derived unit; a polyester-based elastomer; and a phthalate-based plasticizer.

Advantageous Effects

A thermoplastic resin composition of the present invention can exhibit reduced whitening and excellent colorability, surface gloss, mechanical characteristics, and processability.

BEST MODE FOR CARRYING OUT THE INVENTION

Now, the present invention will be described in more detail for easy understanding.

Terms or words used herein shall not be limited to common or dictionary meanings, and have meanings corresponding to technical aspects of the embodiments of the present invention so as to most suitably express the embodiments of the present invention.

In the present invention, a weight average molecular weight and a number average molecular weight may be measured as relative values to a standard polystyrene (PS) sample through gel permeation chromatography (GPC, Waters Breeze) using tetrahydrofuran (THF) as an eluate.

In the present invention, the average particle diameters of a first graft copolymer, a second graft copolymer, and an alkyl (meth)acrylate-based copolymer may be measured using an particle size analyzer (NICOM 380).

In the present invention, the shore D hardness of a polyester-based elastomer may be measured according to ASTM D2240.

The thermoplastic resin composition according to an embodiment of the present invention includes 1. a first graft copolymer including an alkyl (meth)acrylate-based polymer-derived unit, an aromatic vinyl-based monomer-derived unit, and a vinyl cyanide-based monomer-derived unit; 2. a copolymer including an aromatic vinyl-based monomer-derived unit and a vinyl cyanide-based monomer-derived unit; 3. a polyester-based elastomer; and 4. a phthalate-based plasticizer.

In addition, the thermoplastic resin composition according to an embodiment of the present invention may further include 5. a second graft copolymer having an average particle diameter different from that of the first graft copolymer.

Hereinafter, each component of the thermoplastic resin composition of the present invention is described in detail.

1. First Graft Copolymer

The first graft copolymer is included to improve weather resistance, surface gloss, colorability, and mechanical characteristics and reduce whitening of the thermoplastic resin composition according to an embodiment of the present invention.

The first graft copolymer includes an alkyl (meth)acrylate-based copolymer-derived unit, an aromatic vinyl-based monomer-derived unit, and a vinyl cyanide-based monomer-derived unit.

The alkyl (meth)acrylate-based polymer-derived unit may be a unit modified by graft-polymerizing an alkyl (meth)acrylate-based polymer, prepared by polymerizing an alkyl (meth)acrylate-based monomer, with an aromatic vinyl-based monomer and a vinyl cyanide-based monomer.

The alkyl (meth)acrylate-based monomer may be a $C_1$ to $C_{10}$ alkyl (meth)acrylate monomer. The $C_1$ to $C_{10}$ alkyl (meth)acrylate monomer may be one or more selected from the group consisting of methyl acrylate, ethyl acrylate, butyl acrylate, and ethylhexyl acrylate. Thereamong, butyl acrylate is preferred.

The alkyl (meth)acrylate-based polymer may have an average particle diameter of 30 to 150 nm, 40 to 140 nm or 80 to 130 nm. Thereamong, an average particle diameter of 80 to 130 nm is preferred.

Within these ranges, the thermoplastic resin composition exhibits superior weather resistance, surface gloss, and colorability.

The alkyl (meth)acrylate-based polymer-derived unit may be included in an amount of 30 to 70% by weight, 35 to 65% by weight, or 40 to 60% by weight based on a total weight of the first graft copolymer. Thereamong, an amount of 40 to 60% by weight is preferred.

Within these ranges, the first graft copolymer exhibits superior mechanical characteristics and weather resistance.

The aromatic vinyl-based monomer-derived unit may be a unit derived from one or more selected from the group consisting of styrene, α-methyl styrene, p-methyl styrene, and 2,4-dimethyl styrene. Thereamong, a unit derived from styrene is preferred.

The aromatic vinyl-based monomer-derived unit may be included in an amount of 20 to 60% by weight, 20 to 50% by weight, or 20 to 40% by weight based on a total weight of the first graft copolymer. Thereamong, an amount of 20 to 40% by weight is preferred.

Within these ranges, impact resistance and weather resistance of the first graft copolymer may be further improved.

The vinyl cyanide-based monomer-derived unit may be a unit derived from one or more selected from the group consisting of acrylonitrile, methacrylonitrile, and ethacrylonitrile. Thereamong, a unit derived from acrylonitrile is preferred.

The vinyl cyanide-based monomer-derived unit may be included in an amount of 5 to 40% by weight, 10 to 30% by weight or 15 to 25% by weight based on a total weight of the first graft copolymer. Thereamong, an amount of 15 to 25% by weight is preferred.

Within these ranges, impact resistance and weather resistance of the first graft copolymer may be further improved.

The first graft copolymer may have an average particle diameter of 50 to 170 nm, 60 to 160 nm or 100 to 150 nm. Thereamong, an average particle diameter of 100 to 150 nm is preferred.

Within these ranges, appearance characteristics, such as surface gloss and colorability, and mechanical characteristics are excellent.

The first graft copolymer may be included in an amount of 30 to 80% by weight, 40 to 75% by weight, or 45 to 75% by weight based on a total weight of the first graft copolymer, the copolymer, and the polyester-based elastomer. Thereamong, an amount of 45 to 75% by weight is preferred. Within these ranges, flowability during processing of the thermoplastic resin composition is excellent, and impact strength after molding is further improved.

Meanwhile, the first graft copolymer may be prepared by a method including 1) emulsion-polymerizing an alkyl (meth)acrylate-based monomer to prepare an alkyl (meth)acrylate-based polymer; and 2) emulsion-polymerizing the alkyl (meth)acrylate-based polymer, an aromatic vinyl-based monomer, and a vinyl cyanide-based monomer to prepare a first graft copolymer.

Hereinafter, each step of the method of preparing the first graft copolymer is described in detail.

1) Preparing Alkyl (Meth)Acrylate-Based Polymer

First, an alkyl (meth)acrylate-based polymer may be prepared by emulsion-polymerizing an alkyl (meth)acrylate-based monomer.

The alkyl (meth)acrylate-based monomer may be one or more selected from the group consisting of methyl acrylate, ethyl acrylate, butyl acrylate, and ethylhexyl acrylate. Thereamong, butyl acrylate is preferred.

The emulsion polymerization may be performed in the presence of one or more selected from the group consisting of an emulsifier, an initiator, a crosslinking agent, a grafting agent, an electrolyte, and water.

The emulsifier may be one or more selected from the group consisting of metal salt derivatives of a $C_{12}$ to $C_{18}$ alkylsulfosuccinic acid and metal salt derivatives of a $C_{12}$ to $C_{20}$ alkyl ester sulfate.

The metal salt derivatives of the $C_{12}$ to $C_{18}$ alkylsulfosuccinic acid may be one or more selected from the group consisting of sodium dicyclohexylsulfosuccinate, sodium dihexylsulfosuccinate, sodium di-2-ethylhexylsulfosuccinate, potassium di-2-ethylhexylsulfosuccinate, and lithium di-2-ethylhexylsulfosuccinate.

The metal salt derivatives of the $C_{12}$ to $C_{20}$ alkyl ester sulfate may be one or more selected from the group consisting of sodium lauryl sulfate, sodium dodecyl sulfate, sodium dodecylbenzenesulfate, sodium octadecyl sulfate, sodium oleic sulfate, potassium dodecyl sulfate, and potassium octadecyl sulfate.

The emulsifier may be included in an amount of 1 to 5 parts by weight, 1.5 to 4 parts by weight, or 1.5 to 3 parts by weight based on 100 parts by weight of the alkyl (meth)acrylate-based monomer. Thereamong, an amount of 1.5 to 3 parts by weight is preferred.

The emulsifier may be added in a state of being mixed with water. In this case, a pH of 3 to 9 is preferred. Within this range, an emulsifier may be stably dissolved, thereby performing functions thereof. In addition, the activity of an initiator may be further improved.

The initiator may be an inorganic peroxide or an organic peroxide. The inorganic peroxide is a water-soluble initiator and may be one or more selected form the group consisting of potassium persulfate, sodium persulfate, and ammonium persulfate. The organic peroxide is a fat-soluble initiator and may be one or more selected from the group consisting of cumene hydroperoxide and benzoyl peroxide.

The initiator may be added in an amount of 0.05 to 0.5 part by weight, 0.05 to 0.3 part by weight, or 0.05 to 0.2 part by weight based on 100 parts by weight of the alkyl (meth)acrylate-based monomer. Thereamong, an amount of 0.05 to 0.2 part by weight is preferred.

The crosslinking agent may be one or more selected from the group consisting of ethyleneglycol dimethacrylate, diethyleneglycol dimethacrylate, triethyleneglycol dimethacrylate, 1,3-butanediol dimethacrylate, 1,6-hexandiol dimethacrylate, neopentylglycol dimethacrylate, trimethylolpropane trimethacrylate, and trimethylolmethane triacrylate.

The crosslinking agent may be added in an amount of 0.02 to 0.5 part by weight, 0.02 to 0.4 part by weight, or 0.02 to 0.3 part by weight based on 100 parts by weight of the alkyl (meth)acrylate-based monomer. Thereamong, an amount of 0.02 to 0.3 part by weight is preferred. Within these ranges, elasticity, impact strength, and the like of the alkyl (meth)acrylate-based polymer may be further improved.

The grafting agent may be one or more selected from the group consisting of allyl methacrylate, triallyl isocyanurate, triallylamine, and diallylamine.

The grafting agent may be added in an amount of 0.01 to 0.15 part by weight, 0.01 to 0.1 part by weight, or 0.01 to 0.07 part by weight based on 100 parts by weight of the alkyl (meth)acrylate-based monomer. Thereamong, an amount of 0.01 to 0.07 part by weight is preferred. Within these ranges, elasticity, impact strength, and the like of an alkyl (meth) acrylate-based polymer may be further improved.

The electrolyte may be one or more selected from the group consisting of $NaHCO_3$, $Na_2S_2O_7$ and $K_2CO_3$.

The electrolyte may be added in an amount of 0.02 to 0.1 part by weight, 0.04 to 0.06 part by weight, or 0.04 to 0.05 part by weight based on 100 parts by weight of the alkyl (meth)acrylate-based monomer. Thereamong, an amount of 0.04 to 0.05 part by weight is preferred.

The water acts as a medium during the emulsion polymerization and may be ion-exchanged water.

2) Preparing First Graft Copolymer

Subsequently, the first graft copolymer may be prepared by emulsion-polymerizing the alkyl (meth)acrylate-based polymer, an aromatic vinyl-based monomer, and a vinyl cyanide-based monomer.

The alkyl (meth)acrylate-based polymer may be a latex form dispersed in water in a colloidal state.

The alkyl (meth)acrylate-based polymer may be included in a solid content of 30 to 70% by weight, 35 to 65% by weight, or 40 to 60% by weight based on a total weight of the alkyl (meth)acrylate-based polymer, the aromatic vinyl-based monomer, and the vinyl cyanide-based monomer. Thereamong, a solid content of 40 to 60% by weight is preferred. Within these ranges, the impact resistance and weather resistance of the first graft copolymer may be further improved.

The aromatic vinyl-based monomer may be one or more selected from the group consisting of styrene, α-methyl styrene, p-methyl styrene, and 2,4-dimethyl styrene. Thereamong, styrene is preferred.

The aromatic vinyl-based monomer may be included in an amount of 20 to 60% by weight, 20 to 50% by weight or 20 to 40% by weight based on a total weight of the alkyl (meth)acrylate-based polymer, the aromatic vinyl-based monomer, and the vinyl cyanide-based monomer. Thereamong, an amount of 20 to 40% by weight is preferred. Within these ranges, the impact resistance and weather resistance of the first graft copolymer may be further improved.

The vinyl cyanide-based monomer may be one or more selected from the group consisting of acrylonitrile, methacrylonitrile, and ethacrylonitrile. Thereamong, acrylonitrile is preferred.

The vinyl cyanide-based monomer may be included in an amount of 5 to 40% by weight, 10 to 30% by weight, or 15 to 25% by weight based on a total weight of the alkyl (meth)acrylate-based polymer, the aromatic vinyl-based monomer, and the vinyl cyanide-based monomer. Thereamong, an amount of 15 to 25% by weight is preferred. Within these ranges, the impact resistance and weather resistance of the first graft copolymer may be further improved.

The emulsion polymerization may be performed in the presence of one or more selected from the group consisting of an emulsifier, an initiator, a molecular weight regulator, and water.

The emulsifier may be a carboxylic acid metal salt derivative. The carboxylic acid metal salt derivative may be one or more selected from the group consisting of a $C_{12}$ to $C_{20}$ fatty acid metal salt and a rosin acid metal salt. The $C_{12}$ to $C_{20}$ fatty acid metal salt may be one or more selected from the group consisting of a sodium fatty acid, sodium laurylate, sodium oleate, and potassium oleate. The rosin acid metal salt may be one or more selected from the group consisting of sodium rosinate and potassium rosinate.

The emulsifier may be added in an amount of 0.5 to 3 parts by weight, 0.5 to 2 parts by weight, or 1 to 2 parts by weight based on 100 parts by weight of the sum of the alkyl (meth)acrylate-based polymer, the aromatic vinyl-based monomer, and the vinyl cyanide-based monomer. Thereamong, an amount of 1 to 2 parts by weight is preferred.

The initiator may be the same as those used to prepare the alkyl (meth)acrylate-based polymer. Thereamong, an organic peroxide is preferred.

The initiator may be added in an amount of 0.05 to 0.5 part by weight, 0.05 to 0.4 part by weight, or 0.05 to 0.3 part by weight based on 100 parts by weight of the sum of the alkyl (meth)acrylate-based polymer, the aromatic vinyl-based monomer, and the vinyl cyanide-based monomer. Thereamong, an amount of 0.05 to 0.3 part by weight is preferred.

The molecular weight regulator may be one or more selected from the group consisting of t-dodecyl mercaptan and n-octyl mercaptan. Thereamong, t-dodecyl mercaptan is preferred.

The molecular weight regulator may be added in an amount of 0.02 to 0.4 part by weight, 0.02 to 0.3 part by weight, or 0.02 to 0.2 part by weight based on 100 parts by weight of the sum of the alkyl (meth)acrylate-based polymer, the aromatic vinyl-based monomer, and the vinyl cyanide-based monomer. Thereamong, an amount of 0.02 to 0.2 part by weight is preferred.

The emulsion polymerization is preferably performed while continuously adding a reaction mixture including the alkyl (meth)acrylate-based polymer, an aromatic vinyl-based monomer, a vinyl cyanide-based monomer, an emulsifier, an initiator, a molecular weight regulator, water, and the like. When the emulsion polymerization is performed while continuously adding the reaction mixture, it is easy to perform graft polymerization because pH is constantly maintained, the stability of graft copolymer particles is excellent, and particles, the inside of which is uniform, may be prepared.

In addition, the first graft copolymer which has been emulsion-polymerized may have a latex form. The first graft copolymer latex may have a pH of 8 to 11 or a pH of 9 to 10.5. Within these ranges, the latex exhibits excellent stability.

The first graft copolymer latex may be prepared in a powder form through coagulation, aging, washing, dehydration, and drying processes.

When the coagulation is performed, a coagulant may be added to the first graft copolymer latex. The coagulation is preferably performed at 80 to 95° C. under atmospheric pressure. The coagulant may be an aqueous calcium chloride solution.

The aging may be performed at 90 to 95° C. for 10 to 30 minutes after the coagulation.

The drying may be performed using hot air at 85 to 95° C. for 10 to 60 minutes.

2. Copolymer

The copolymer, which is a matrix copolymer, is included to reduce whitening of the thermoplastic resin composition according to an embodiment of the present invention and improve colorability thereof.

The copolymer includes an aromatic vinyl-based monomer-derived unit and a vinyl cyanide-based monomer-derived unit.

The aromatic vinyl-based monomer-derived unit may be a unit derived from one or more selected from the group consisting of styrene, α-methyl styrene, p-methyl styrene, and 2,4-dimethyl styrene. Thereamong, a unit derived from one or more selected from the group consisting of styrene and α-methyl styrene is preferred.

The vinyl cyanide-based monomer-derived unit may be a unit derived from one or more selected from the group consisting of acrylonitrile, methacrylonitrile, and ethacrylonitrile. Thereamong, a unit derived from acrylonitrile is preferred.

The copolymer may include the aromatic vinyl-based monomer-derived unit and the vinyl cyanide-based monomer-derived unit in a weight ratio of 60:40 to 90:10, 65:35 to 85:15, or 70:30 to 80:20. Thereamong, a weight ratio of 70:30 to 80:20 is preferred. Within these ranges, chemical resistance and processability may be further improved.

The copolymer may be one or more selected from the group consisting of a copolymer including a styrene-derived unit and an acrylonitrile-derived unit; a copolymer including an α-methyl styrene-derived unit and an acrylonitrile-derived unit; and a copolymer including an α-methyl styrene-derived unit, a styrene-derived unit, and an acrylonitrile-derived unit.

The copolymer may have a weight average molecular weight of 50,000 to 250,000 g/mol, 80,000 to 220,000 g/mol, or 110,000 to 190,000 g/mol. Thereamong, a weight average molecular weight of 110,000 to 190,000 g/mol is preferred.

Within these ranges, whitening of the thermoplastic resin composition may be reduced and colorability thereof may be further improved.

The copolymer may be included in an amount of 10 to 50% by weight, 15 to 45% by weight, or 20 to 40% by weight based on a total weight of the first graft copolymer, the copolymer, and the polyester-based elastomer in the thermoplastic resin composition according to an embodiment of the present invention. Thereamong, an amount of 20 to 40% by weight is preferred. Within these ranges, flowability during processing of the thermoplastic resin composition is excellent and impact strength after molding may be further improved.

3. Polyester-Based Elastomer

The polyester-based elastomer is included to reduce whitening of the thermoplastic resin composition according to an embodiment of the present invention and improve colorability, processability, aging resistance, and chemical resistance thereof.

The polyester-based elastomer may include a hard portion including a unit derived from an aromatic or aliphatic dicarboxylic acid or an ester thereof and an aliphatic diol-derived unit; and a soft portion including a polyalkylene oxide-derived unit.

The aromatic or aliphatic dicarboxylic acid-derived unit may be a unit derived from one or more selected from the group consisting of terephthalic acid, isophthalic acid, 2,6-naphthalene dicarboxylic acid, 1,5-naphthalene dicarboxylic acid, 1,4-naphthalene dicarboxylic acid, and 1,4-cyclohexane dicarboxylic acid.

The unit derived from the ester of the aromatic or aliphatic dicarboxylic acid may be a unit derived from one or more selected from the group consisting of dimethyl terephthalate, dimethyl isophthalate, dimethyl 2,6-naphthalene dicarboxylate, dimethyl 1,5-naphthalene dicarboxylate, dimethyl 1,4-naphthalene dicarboxylate, and dimethyl 1,4-cyclohexane dicarboxylate. Thereamong, a dimethyl terephthalate-derived unit is preferred.

The unit derived from an aromatic or aliphatic dicarboxylic acid or an ester thereof may be included in an amount of 25 to 65% by weight or 30 to 60% by weight based on a total weight of the polyester-based elastomer. Thereamong, an amount of 30 to 60% by weight is preferred.

The aliphatic diol-derived unit may be a unit derived from an aliphatic diol having a molecular weight of 300 g/mol or less.

The aliphatic diol-derived unit may be a unit derived from one or more selected from the group consisting of ethylene glycol, propylene glycol, 1,2-propanediol, 1,3-propanediol, 1,4-butanediol, 1,5-pentadiol, 1,6-hexandiol and 1,4-cyclohexane dimethanol. Thereamong, a unit derived from 1,4-butanediol is preferred.

The aliphatic diol-derived unit may be included in an amount of 20 to 45% by weight or 25 to 40% by weight based on a total weight of the polyester-based elastomer. Thereamong, an amount of 25 to 40% by weight is preferred.

The polyalkylene oxide-derived unit may be a unit derived from aliphatic polyether.

The polyalkylene oxide-derived unit may be a unit derived from one or more selected from the group consisting of polyethylene glycol, polypropylene glycol, polytetramethylene glycol, polyhexamethylene glycol, a copolymer of ethylene oxide and propylene oxide, an ethyleneoxide-added polymer of polypropylene glycol, and a copolymer of ethylene oxide and tetrahydrofuran. Thereamong, a unit derived from polytetramethylene glycol or an ethyleneoxide-added polymer of polypropylene glycol is preferred.

The polytetramethylene glycol may have a number average molecular weight of 600 to 3,000 g/mol, 1,000 to 2,500 g/mol, or 1,800 to 2,200 g/mol. Thereamong, a number average molecular weight of 1,800 to 2,200 g/mol is preferred.

The ethyleneoxide-added polymer of polypropylene glycol may be polypropylene glycol, a terminal of which is capped with ethylene oxide, and may have a weight average molecular weight of 2,000 to 3,000 g/mol.

The polyalkylene oxide-derived unit may be included in an amount of 10 to 50% by weight or 15 to 45% by weight based on a total weight of the thermoplastic polyester-based elastomer. Within these ranges, the flexibility, heat resistance, and usability of the polyester-based elastomer may be further improved.

Meanwhile, the polyester-based elastomer may have a weight average molecular weight of 2,000 to 3,000 g/mol.

The polyester-based elastomer may have a shore D hardness of 35 to 55 or 40 to 50. Thereamong, a shore D hardness of 40 to 50 is preferred.

Within these ranges, the thermoplastic resin composition may be easily extruded and molded and may exhibit improved chemical resistance. In addition, the tensile strength, flexural strength, impact strength, and the like of the thermoplastic resin composition may be remarkably improved and whitening thereof may be reduced.

When the shore D hardness of the polyester-based elastomer is below the ranges, the tensile strength and flexural strength of the thermoplastic resin composition may be remarkably decreased, and thus, whitening thereof may remarkably increase.

When the shore D hardness of the polyester-based elastomer exceeds the ranges, the impact strength of the thermoplastic resin composition may be remarkably decreased.

When the weight of the polyester-based elastomer is measured at 230° C. under a load of 2.16 kg for 10 minutes according to ASTM D1238, a melt index may be 0.1 to 10 g/min or 1 to 10 g/min.

Within these ranges, the thermoplastic resin composition may be easily extruded and molded and may exhibit improved chemical resistance.

The polyester-based elastomer may be included in an amount of 3 to 20% by weight, 4 to 18% by weight, or 5 to 15% by weight, based on a total weight of the first graft copolymer, the copolymer, and the polyester-based elastomer, in the thermoplastic resin composition according to an embodiment of the present invention. Thereamong, an amount of 5 to 15% by weight is preferred. Within these ranges, whitening may be reduced and colorability and aging resistance may be further improved.

Meanwhile, the polyester-based elastomer may be prepared by a method including 1) melt-polymerizing a derivative formed from an aromatic or aliphatic dicarboxylic acid or an ester thereof, an aliphatic diol, and polyalkylene oxide to prepare a polyester-based elastomer precursor; and 2) solid state-polymerizing the polyester-based elastomer precursor to prepare a polyester-based elastomer.

Hereinafter, each step of the method of preparing the polyester-based elastomer is described in detail.

1) Preparing Polyester-Based Elastomer Precursor

First, an aromatic or aliphatic dicarboxylic acid or an ester thereof, an aliphatic diol, and polyalkylene oxide may be prepared as starting materials.

The aromatic or aliphatic dicarboxylic acid or the ester thereof may be included in an amount of 25 to 65% by weight or 30 to 60% by weight based on a total weight of the starting materials. Thereamong, an amount of 30 to 60% by weight is preferred. Within these ranges, reaction balance is excellent, and thus, melt-polymerization may be smoothly performed.

Particular examples of the aromatic or aliphatic dicarboxylic acid or the ester thereof have been described above.

The aliphatic diol may be added in an amount of 20 to 45% by weight or 25 to 40% by weight based on a total weight of the starting materials. Within these ranges, reaction balance is excellent, and thus, melt-polymerization may be smoothly performed.

Particular examples of the aliphatic diol have been described above.

The polyalkylene oxide may be added in an amount of 10 to 50% by weight or 15 to 45% by weight based on a total weight of the starting materials. Thereamong, an amount of 15 to 45% by weight is preferred. Within these ranges, the flexibility, heat resistance, and usability of the polyester-based elastomer may be further improved.

Particular examples of the polyalkylene oxide have been described above.

Subsequently, a catalyst is primarily added to the starting materials and the temperature is elevated to 140 to 215° C., followed by initiating melt-polymerization.

The catalyst may be titanium butoxide.

When the melt-polymerization is initiated, an ester exchange reaction may occur between the starting materials, thereby preparing an oligomer, preferably a bis(4-hydroxy butyl)terephthalate (BHBT) oligomer. The ester exchange reaction may be performed for 1 to 3 hours or 1 hour and 30 minutes to 2 hours and 30 minutes.

Subsequently, a catalyst is secondarily added to the oligomer, and then the temperature is elevated to 215 to 245° C., followed by performing condensation polymerization while lowering the pressure from 760 torr to 0.3 torr. A polyester-based elastomer precursor may be prepared through the condensation polymerization.

The condensation polymerization may be performed for 1 to 3 hours or 1 hour and 30 minutes to 2 hours and 30 minutes.

A melt index of the polyester-based elastomer precursor, measured at 230° C. under a load of 2.16 kg for 10 minutes according to ASTM D1238, may be 15 to 25 g/10 min or 18 to 22 g/10 min.

Subsequently, the polyester-based elastomer precursor is discharged in a strand shape using a nitrogen pressure and pelletized, thereby preparing a pellet-shaped polyester-based elastomer precursor.

Meanwhile, a branching agent may be further added to improve melt viscosity and melt tension of the polyester-based elastomer during the melt-polymerization.

The branching agent may be one or more selected from the group consisting of glycerol, pentaerythritol, trimellitic anhydride, trimellitic acid, trimethylol propane, and neopentyl glycol. Thereamong, trimellitic anhydride is preferred.

The branching agent may be included in an amount of 0.05 to 0.1% by weight based on 100 parts by weight of the starting materials. Within these ranges, the melt viscosity and degree of polymerization of the polyester-based elastomer are appropriate, it is easy to control melt polymerization, and the polyester-based elastomer precursor may be easily discharged to the outside of a reactor.

2) Preparing Polyester-Based Elastomer

Subsequently, the polyester-based elastomer precursor may be solid state-polymerized, thereby preparing a polyester-based elastomer.

The solid state-polymerization may be performed while gradually lowering the pressure into a high vacuum state at 140 to 200° C. for 10 to 24 hours under an inert atmosphere after feeding the polyester-based elastomer precursor into a reactor for solid state polymerization.

The reactor for solid state polymerization may be a vacuum vessel dryer to which a rotatable high-vacuum pump is connected. The inert atmosphere may be a nitrogen atmosphere.

Meanwhile, a commercially available material may be used as the polyester-based elastomer. Preferably, KEYFLEX BT 2140D (manufactured by LG Chemical, DSC melting point: 198° C., shore A hardness: 95, shore D hardness: 43) may be used.

4. Phthalate-Based Plasticizer

The phthalate-based plasticizer is included to reduce whitening of the thermoplastic resin composition and improve processability thereof.

The phthalate-based plasticizer may be one or more selected from the group consisting of diisopropyl phthalate, dibutyl phthalate, di-2-ethylhexyl phthalate, diisononyl phthalate, diisodecyl phthalate, and butyl benzyl phthalate. Thereamong, diisopropyl phthalate is preferred.

The phthalate-based plasticizer may be included in an amount of 1 to 20 parts by weight, 2 to 15 parts by weight, or 3 to 10 parts by weight based on 100 parts by weight of the sum of the first graft copolymer, the copolymer, and the polyester-based elastomer. Thereamong, an amount of 3 to 10 parts by weight is preferred.

Within these ranges, the processability and surface gloss of the thermoplastic resin composition may be further improved.

5. Second Graft Copolymer

The second graft copolymer may be included to reduce whitening of the thermoplastic resin composition and improve mechanical characteristics thereof.

The second graft copolymer may include an alkyl (meth) acrylate-based polymer-derived unit, an aromatic vinyl-based monomer-derived unit, and a vinyl cyanide-based monomer-derived unit.

The alkyl (meth)acrylate-based polymer-derived unit may be a unit modified by graft-polymerizing an alkyl (meth) acrylate-based polymer, prepared by polymerizing an alkyl (meth)acrylate-based monomer, with an aromatic vinyl-based monomer and a vinyl cyanide-based monomer.

The alkyl (meth)acrylate-based polymer may have an average particle diameter of greater than 150 nm and 600 nm or less, 250 to 550 nm, or 350 to 500 nm. Thereamong, an average particle diameter of 350 to 500 nm is preferred.

Within these ranges, the mechanical characteristics of the thermoplastic resin composition may be further improved.

Particular examples and contents of the alkyl (meth) acrylate-based polymer-derived unit, the aromatic vinyl-based monomer-derived unit, and the vinyl cyanide-based monomer-derived unit are the same as those described in "1. First graft copolymer."

The second graft copolymer may have an average particle diameter of greater than 250 nm and 750 nm or less, 350 to 700 nm, or 450 to 650 nm. Thereamong, an average particle diameter of 450 to 600 nm is preferred. Within these ranges, the mechanical characteristics of the thermoplastic resin composition may be further improved.

The second graft copolymer may be included in an amount of 5 to 40% by weight, 15 to 35% by weight, or 25 to 30% by weight based on a total weight of the first graft copolymer, the second graft copolymer, the copolymer, and the polyester-based elastomer. Thereamong, an amount of 25 to 30% by weight is preferred. Within these ranges, impact strength, surface hardness and scratch resistance may be further improved.

A weight ratio of the first graft copolymer to the second graft copolymer may be 1:1 to 1:8, 1:1 to 1:6, or 1:1 to 1:4. Thereamong, a weight ratio of 1:1 to 1:4 is preferred. Within these ranges, surface gloss, colorability, and weather resistance are excellent.

Meanwhile, the second graft copolymer may be prepared in the same manner as the first graft copolymer is, except that an alkyl (meth)acrylate-based monomer and an emulsifier are used in different amounts to prepare an alkyl (meth)acrylate-based copolymer.

A weight ratio of the alkyl (meth)acrylate-based monomer added to prepare the second graft copolymer to the alkyl (meth)acrylate-based monomer added to prepare the first graft copolymer may be 1.6:1 to 10:1.

The amount of the emulsifier added to prepare the alkyl (meth)acrylate-based polymer of the second graft copolymer may be 0.1 to 1 part by weight based on 100 parts by weight of the alkyl (meth)acrylate-based monomer.

The pH of the alkyl (meth)acrylate-based polymer latex added to prepare the second graft copolymer may be 5 to 9 or 6 to 8. Thereamong, a pH of 6 to 8 is preferred. Within these ranges, the stability of a latex is excellent.

Meanwhile, the thermoplastic resin composition according to an embodiment of the present invention may further include an additive. The additive may be one or more selected from the group consisting of an anti-dripping agent, a flame retardant, an antibacterial agent, an antistatic agent, a stabilizer, a release agent, a heat stabilizer, an ultraviolet stabilizer, an inorganic additive, a lubricant, an antioxidant, a light stabilizer, a pigment, a dye, and an inorganic filler. Thereamong, one or more selected from the group consisting of a lubricant, an antioxidant and an ultraviolet stabilizer is preferred.

The additive may be included in an amount of 0.1 to 20 parts by weight, 0.1 to 15 parts by weight, or 0.1 to 10 parts by weight based on 100 parts by weight of the sum of the first graft copolymer, the copolymer, and the polyester-based elastomer. Thereamong, an amount of 0.1 to 10 parts by weight is preferred.

The lubricant may be included in an amount of 0.1 to 10 parts by weight, 0.1 to 5 parts by weight, or 0.1 to 3 parts by weight based on 100 parts by weight of the sum of the first graft copolymer, the copolymer, and the polyester-based elastomer. Thereamong, an amount of 0.1 to 3 parts by weight is preferred.

The antioxidant may be included in an amount of 0.1 to 2 parts by weight, 0.1 to 1.5 parts by weight, or 0.1 to 1 part by weight based on 100 parts by weight of the sum of the first graft copolymer, the copolymer, and the polyester-based elastomer. Thereamong, an amount of 0.1 to 1 part by weight is preferred.

The ultraviolet stabilizer may be included in an amount of 0.1 to 4 parts by weight, 0.1 to 3 parts by weight, or 0.1 to 2 parts by weight based on 100 parts by weight of the sum of the first graft copolymer, the copolymer, and the polyester-based elastomer. Thereamong, an amount of 0.1 to 2 parts by weight is preferred.

The thermoplastic resin composition according to an embodiment of the present invention may be manufactured into a sheet. The sheet may be a sheet for roofs.

MODE FOR CARRYING OUT THE INVENTION

Now, exemplary embodiments of the present invention are described in detail so that those of ordinary skill in the art can easily carry out the present invention. The present invention may be implemented in various different forms and is not limited to these embodiments.

Example 1

70 parts by weight of a first graft copolymer (average particle diameter: 130 nm, core: 50% by weight of a butylacrylate polymer-derived unit, shell: 30% by weight of a styrene-derived unit and 20% by weight of an acrylonitrile-derived unit), 20 parts by weight of an SAN copolymer (manufacturer: LG Chemical, product name: 90HR, a weight average molecular weight: 150,000 g/mol) as a copolymer, 10 parts by weight of a polyester-based elastomer (manufacturer: LG Chemical, product name: KEYFLEX BT2140D resin, shore D hardness: 43), 5 parts by weight of diisopropyl phthalate as a phthalate-based plasticizer, 3 parts by weight of an EBS resin (manufacturer: SUNKOO) as a lubricant, 0.4 part by weight of Irgranox 1076 (product name, manufacturer: BASF) as an antioxidant, 0.4 part by weight of Irgrafos 168 (product name, manufacturer: BASF), 0.6 part by weight of Tinuvin 770 (product name, manufacturer: BASF) as an ultraviolet stabilizer, and 0.6 part by weight of Sunsorb329 (product name, manufacturer: SUNFINE GLOBAL) were added to prepare a thermoplastic resin composition.

The thermoplastic resin composition was fed into an extrusion kneader and manufactured in a pellet shape using a 230° C. cylinder. The pellet-shaped composition was injected-molded to manufacture a specimen.

Example 2

A specimen was manufactured in the same manner as in Example 1, except that 60 parts by weight of a first graft copolymer and 30 parts by weight of an SAN copolymer were added.

Example 3

A specimen was manufactured in the same manner as in Example 1, except that 35 parts by weight of a first graft copolymer and 35 parts by weight of a second graft copolymer (average particle diameter: 500 nm, core: 50% by weight of a butylacrylate polymer-derived unit, shell: 30% by weight of a styrene-derived unit and 20% by weight of an acrylonitrile-derived unit) were added.

Example 4

A specimen was manufactured in the same manner as in Example 1, except that 15 parts by weight of a first graft copolymer and 55 parts by weight of a second graft copolymer (average particle diameter: 500 nm, core: 50% by weight of a butylacrylate polymer-derived unit, shell: 30% by weight of a styrene-derived unit and 20% by weight of an acrylonitrile-derived unit) were added.

Comparative Example 1

A specimen was manufactured in the same manner as in Example 1, except that a first graft copolymer and a phthalate-based plasticizer were not added, and 70 parts by weight of a second graft copolymer (average particle diameter: 500 nm, core: 50% by weight of a butylacrylate polymer-derived unit, shell: 30% by weight of a styrene-derived unit and 20% by weight of an acrylonitrile-derived unit) was added.

Comparative Example 2

A specimen was manufactured in the same manner as in Example 1, except that 20 parts by weight of a first graft copolymer, 30 parts by weight of a second graft copolymer (average particle diameter: 500 nm, core: 50% by weight of a butylacrylate polymer-derived unit, shell: 30% by weight of a styrene-derived unit and 20% by weight of an acrylonitrile-derived unit), 50 parts by weight of a copolymer, and 4 parts by weight of a phthalate-based plasticizer were added and a polyester-based elastomer was not added.

Comparative Example 3

A specimen was manufactured in the same manner as in Example 1, except that a polyester-based elastomer was not added.

Comparative Example 4

A specimen was manufactured in the same manner as in Example 1, except that a phthalate-based plasticizer was not added.

The compositions of the specimens of Examples 1 to 4 and Comparative Examples 1 to 4 are summarized in Tables 1 and 2 below.

TABLE 1

| Classification | Example 1 (parts by weight) | Example 2 (parts by weight) | Example 3 (parts by weight) | Example 4 (parts by weight) |
|---|---|---|---|---|
| First graft copolymer | 70 | 60 | 35 | 15 |
| Second graft copolymer | — | — | 35 | 55 |
| Copolymer | 20 | 30 | 20 | 20 |
| Polyester-based elastomer | 10 | 10 | 10 | 10 |
| Phthalate-based plasticizer | 5 | 5 | 5 | 5 |

TABLE 2

| Classification | Comparative Example 1 (parts by weight) | Comparative Example 2 (parts by weight) | Comparative Example 3 (parts by weight) | Comparative Example 4 (parts by weight) |
|---|---|---|---|---|
| First graft copolymer | — | 20 | 70 | 70 |
| Second graft copolymer | 70 | 30 | — | — |
| Copolymer | 20 | 50 | 20 | 20 |
| Polyester-based elastomer | 10 | — | — | 10 |
| Phthalate-based plasticizer | — | 4 | 5 | — |

Experimental Example

The characteristics of the specimens of Examples 1 to 4 and Comparative Examples 1 to 4 were measured according to the following methods. Results are summarized in Tables 3 and 4 below.

Rubber content (% by weight): Quantitatively measured according to FT-IR.

Surface gloss (%): Measured according to ASTM D523 at an angle of 45°.

Impact strength (¼ In, kgf·cm/cm): Measured according to ASTM D256.

Flexural strength (kgf/cm$^2$): Measured according to ASTM D790.

Tensile strength (kgf/cm$^2$): Measured according to ASTM D638.

Low whitening: Measured according to ASTM D2176.

Surface hardness: Measured according to ASTM D785.

Colorability: An L value of a specimen for measuring colorability was measured using a color difference meter. Here, as an L value is low, the brightness is low, and thus, a color is dark black, which indicates good colorability.

TABLE 3

| Classification | Example 1 | Example 2 | Example 3 | Example 4 |
|---|---|---|---|---|
| Low whitening | ⊚ | ○ | ⊚ | ⊚ |
| Colorability | 77.85 | 80.68 | 78.21 | 82.10 |
| Rubber content | 34.3 | 29.4 | 34.7 | 35.0 |
| Surface gloss | 72.5 | 84.2 | 24.8 | 29.6 |
| Impact strength | 39.13 | 42.29 | 37.07 | 38.07 |
| Flexural strength | 295 | 386 | 258 | 194 |
| Tensile strength | 190 | 220 | 167 | 156 |
| Surface hardness | 46.0 | 41.2 | 47.1 | 46.5 |

TABLE 4

| Classification | Comparative Example 1 | Comparative Example 2 | Comparative Example 3 | Comparative Example 4 |
|---|---|---|---|---|
| Low whitening | Δ | X | Δ | Δ |
| Colorability | 83.59 | 84.60 | 80.98 | 81.42 |
| Rubber content | 35.0 | 25.0 | 34.3 | 34.3 |
| Surface gloss | 24.0 | 50.0 | 88.1 | 89.0 |
| Impact strength | 38.12 | 6.98 | 31.3 | 24.7 |
| Flexural strength | 271 | 502 | 435 | 518 |
| Tensile strength | 170 | 285 | 263 | 311 |
| Surface hardness | 47.2 | 74.4 | 53.4 | 68.5 |

Referring to Table 3 and 4, it can be confirmed that the specimens of Examples 1 to 4 exhibit greatly reduced whitening and remarkably improved impact strength, compared to the specimens of Comparative Examples 1 to 4. Meanwhile, it can be confirmed that, in the case of Examples 3 and 4 further including the second graft copolymer having a large diameter, a low gloss characteristic is exhibited, unlike Examples 1 and 2. In addition, comparing Example 1 and Comparative Examples 3 and 4, it can be confirmed that Example 1 exhibits low whitening and excellent colorability, impact strength, flexural strength, and tensile strength, compared to Comparative Example 3 excluding the polyester-based elastomer. Further, it can be confirmed that Example 1 exhibits low whitening and excellent colorability and impact strength, compared to Comparative Example 4 excluding the phthalate-based plasticizer.

The invention claimed is:

1. A thermoplastic resin composition, comprising:
    a first graft copolymer comprising an alkyl (meth)acrylate-based polymer-derived unit, an aromatic vinyl-based monomer-derived unit and a vinyl cyanide-based monomer-derived unit;
    a copolymer comprising an aromatic vinyl-based monomer-derived unit and a vinyl cyanide-based monomer-derived unit;
    a polyester-based elastomer comprising a hard portion comprising a unit derived from an aromatic or aliphatic dicarboxylic acid or an ester thereof and an aliphatic diol-derived unit; and a soft portion comprising a polyalkylene oxide-derived unit; and
    a phthalate-based plasticizer,
    wherein 3 to 20% by weight of the polyester-based elastomer are comprised based on a total weight of the first graft copolymer, the copolymer, and the polyester-based elastomer.

2. The thermoplastic resin composition of claim 1, wherein the phthalate-based plasticizer is comprised in an amount of 1 to 20 parts by weight based on 100 parts by weight of the sum of the first graft copolymer, the copolymer, and the polyester-based elastomer.

3. The thermoplastic resin composition of claim 1, wherein 30 to 80% by weight of the first graft copolymer and 10 to 50% by weight of the copolymer are comprised based on a total weight of the first graft copolymer, the copolymer, and the polyester-based elastomer.

4. The thermoplastic resin composition of claim 1, wherein the first graft copolymer comprises:
    30 to 70% by weight of the alkyl (meth)acrylate-based polymer-derived unit;
    20 to 60% by weight of the aromatic vinyl-based monomer-derived unit; and
    5 to 40% by weight of the vinyl cyanide-based monomer-derived unit.

5. The thermoplastic resin composition of claim 1, wherein the first graft copolymer has an average particle diameter of 50 to 170 nm.

6. The thermoplastic resin composition of claim 1, wherein the copolymer has a weight average molecular weight of 50,000 to 250,000 g/mol.

7. The thermoplastic resin composition of claim 1, wherein the copolymer comprises the aromatic vinyl-based monomer-derived unit and the vinyl cyanide-based monomer-derived unit in a weight ratio of 60:40 to 90:10.

8. The thermoplastic resin composition of claim 1, wherein the polyester-based elastomer has a shore D hardness of 35 to 55.

9. The thermoplastic resin composition of claim 1, wherein the phthalate-based plasticizer is one or more selected from the group consisting of diisopropyl phthalate, dibutyl phthalate, di-2-ethylhexyl phthalate, diisononyl phthalate, diisodecyl phthalate, and butyl benzyl phthalate.

10. The thermoplastic resin composition of claim 1, wherein the thermoplastic resin composition further comprises a second graft copolymer that has an average particle diameter different from that of the first graft copolymer and comprises an alkyl (meth)acrylate-based polymer-derived unit, an aromatic vinyl-based monomer-derived unit, and a vinyl cyanide-based monomer-derived unit.

11. The thermoplastic resin composition of claim 10, wherein the second graft copolymer has an average particle diameter of greater than 250 nm and 750 nm or less.

12. The thermoplastic resin composition of claim 10, wherein a weight ratio of the first graft copolymer to a second graft copolymer is 1:1 to 1:8.

* * * * *